United States Patent
Leisinger et al.

(10) Patent No.: US 7,232,963 B2
(45) Date of Patent: Jun. 19, 2007

(54) SCALE HAVING A DISPLAY AND OPERATING UNIT

(75) Inventors: Roger Leisinger, Zurich (CH); Patrik Morf, Nanikon (CH)

(73) Assignee: Mettler-Toledo AG, Greifensee (CH)

( * ) Notice: Subject to any disclaimer, the term of this patent is extended or adjusted under 35 U.S.C. 154(b) by 71 days.

(21) Appl. No.: 10/554,142

(22) PCT Filed: Apr. 27, 2004

(86) PCT No.: PCT/EP2004/004499

§ 371 (c)(1),
(2), (4) Date: Oct. 20, 2005

(87) PCT Pub. No.: WO2004/097349

PCT Pub. Date: Nov. 11, 2004

(65) Prior Publication Data

US 2006/0213696 A1   Sep. 28, 2006

(30) Foreign Application Priority Data

Apr. 30, 2003   (DE) ............................... 103 19 779

(51) Int. Cl.
   *G01G 21/28* (2006.01)
(52) U.S. Cl. .................................... 177/238
(58) Field of Classification Search ......... 177/238–244
   See application file for complete search history.

(56) References Cited

U.S. PATENT DOCUMENTS

| | | | |
|---|---|---|---|
| 4,582,151 A * | 4/1986 | Mairot et al. ................ | 177/144 |
| 4,669,029 A * | 5/1987 | Svenson et al. ............. | 361/728 |
| 4,979,579 A | 12/1990 | Dardat | |
| 5,203,419 A * | 4/1993 | Douglas ...................... | 177/244 |
| 5,962,817 A * | 10/1999 | Rodriguez ................... | 177/126 |
| 6,013,878 A * | 1/2000 | Schwartz et al. ......... | 177/25.13 |
| 6,037,548 A * | 3/2000 | Baitz et al. .............. | 177/25.13 |
| 6,194,671 B1* | 2/2001 | Vaghi ....................... | 177/25.15 |
| 6,633,007 B1 | 10/2003 | Luchinger | |
| 6,713,690 B2* | 3/2004 | Bierich et al. .............. | 177/180 |
| 6,891,113 B2 | 5/2005 | Fringeli | |

FOREIGN PATENT DOCUMENTS

GB   2 246 446 A   1/1992

\* cited by examiner

*Primary Examiner*—Randy W. Gibson
(74) *Attorney, Agent, or Firm*—Standley Law Group LLP

(57) ABSTRACT

A scale (1) having a scale housing (3) serving to house the weighing mechanism and the weighing electronics, which stands on a support base on at least three support points (5,5'), is designed to be connectable to and disconnectable from a display and operating unit (6). A connection element (9) is provided to produce a mechanical coupling between the scale (1) and the display and operating unit (6), which can be attached to the bottom side of the scale housing (3) and is designed to be supported on at least two support points (5) of the scale (1) and can be engaged in a self-locating way in a third point on the bottom side of the scale housing (3).

20 Claims, 2 Drawing Sheets

SCALE HAVING A DISPLAY AND OPERATING UNIT

The present invention relates to a scale having a scale housing serving for housing the scale mechanism and the scale electronics, which stands on a support base on at least three support points, and having a display and operating unit, which is designed to be connectable to and disconnectable from the scale, a connection element being provided for producing a mechanical connection between the scale and the display and operating unit.

BACKGROUND OF THE ART

Such scales are preferably used in laboratories, at production sites, or in warehouses. In these locations, the available work space is frequently limited and therefore one of the requirements for such a scale is its flexibility with regard to its setup location and the positioning of the scale housing and the display and operating unit in relation to each other.

Scales whose scale housing can be connected to their display and operating unit or can be positioned separately therefrom at the work space are known in the related art. For example, U.S. Pat. No. 6,633,007 B1 describes a scale in which the display and operating unit may be placed both adjacent to a housing and also at a distance therefrom. To store excess length of the connection cable between the scale housing and the display and operating unit, a shaft is positioned on the floor of the housing, in which the cable is freely movable as it is pulled out and pushed in. The display and operating unit is guided on the housing of the scale by using an adapter. In this case, the scale housing and the display and operating unit stand on the support base independently from one another.

Scales are known which are optimized with regard to a low overall height, and in which the height of the free space located between the support base, such as the working table, and the bottom of the scale housing is only a few millimeters, so that an arrangement of a shaft described above can not be realized. The attachability and easy removability of the display and operating unit to and from the housing is particularly difficult if the requirement exists of being able to place the display and operating unit both adjacent to the housing and also at a distance therefrom.

It is therefore the object of the present invention to provide a stable anchoring of the display and operating unit, when it is placed directly on the scale, particularly a scale of low construction, in which scale the display and operating unit can be placed both adjacent to the scale and also at a distance therefrom, wherein connecting parts neither project from the scale nor from the display and operating unit when the display and operating unit is placed at a distance from the scale.

SUMMARY OF THE INVENTION

This object is achieved by the features of the appended claims. A scale having a scale housing serving to house the scale mechanism and the scale electronics, which stands on a support base on at least three support points, is designed to be connectable to and disconnectable from a display and operating unit. A connection element is provided for producing a mechanical coupling between the scale and the display and operating unit, wherein the connection element is attachable to the bottom of the scale housing and is designed to be supported on at least two support points of the scale and can be engaged in a self-locating way in a third point on the bottom of the scale housing.

By a self-centering engaging coupling of the connection element on the bottom side of the scale housing, the display and operating unit can be attached rapidly and easily to the scale on the scale housing and removed therefrom without the use of any tools. For this purpose, a coupling part is positioned on the bottom of the scale housing, in which the connection element is able to engage in a self-centering way. If the display and operating unit is placed directly on the scale, the connection element is positioned below this unit in such a way that preferably no parts project. In addition, if the display and operating unit is positioned away from the scale, the connection element is removable, so that no parts project on the scale even in this situation. Furthermore, the scale, the display and operating unit and the connection element are easy to clean.

If the display and operating unit is placed directly on the scale, the scale may be lifted together with this unit in a stable way, since both parts are supported by the connection element. Therefore, the support base on which the scale stands can be cleaned without problems.

In a preferred embodiment of the scale, the coupling part is attached close to a third support point on the bottom side of the scale housing.

In an particularly advantageous embodiment, the coupling part has the shape of two isoceles triangles which are connected to one another, the first triangle representing an acute-angled triangle and the second triangle, which faces towards the connection element in the installed state, representing an obtuse-angled triangle.

The coupling part preferably comprises elastic catch elements having bulges which are designed to engage in recesses of the connection element.

For a scale having a low construction, it is advantageous if the connection element is designed to be very flat and, in particular, is manufactured from an approximately 0.5 to 2 mm thick sheet of aluminium or sheet of steel or is manufactured as a plastic part.

In an advantageous refinement, each of the two support points comprise a wheel for the adjustment to level the scale, wherein the connection element is supported on the top of the particular wheel. In addition, the scale according to the present invention is designed in such a way that the display and operating unit and the scale stand on the support base independently from one another, so that the scale may be levelled independently from the display and operating unit.

The connection element is particularly formed in such a way that, in its installed state, it is oriented parallel to the support base of the scale approximately up to the area of the support points and then it is bent by an angle $\alpha$ in the direction of the coupling part, whereby a simple engagement of the connection element into the coupling part may be reached.

A channel for guiding unneeded cable length of the connection cable between the scale and the display and operating unit is provided on the bottom side of the scale housing. In addition, the scale housing has recessed grips on both sides.

BRIEF DESCRIPTION OF THE DRAWINGS

The scale according to the present invention is described in detail in the following on the basis of an exemplary embodiment illustrated in the drawings, wherein.

DETAILED DESCRIPTION OF A PREFERRED EMBODIMENT

Figure 1:
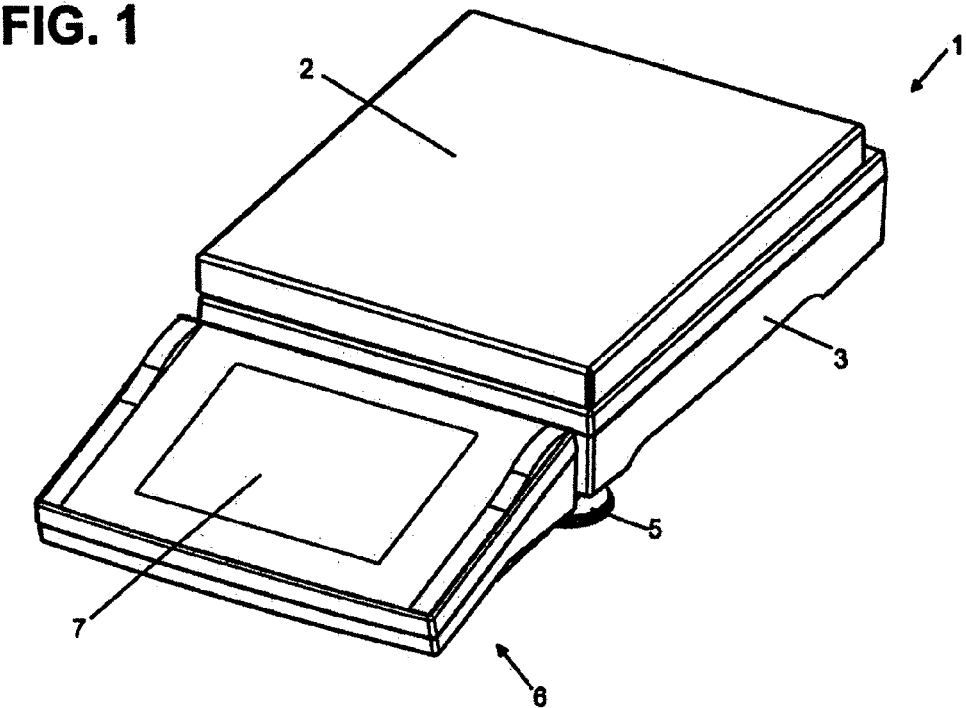
FIG. 1 shows a three-dimensional illustration of the scale having a display and operating unit.

FIG. 1 shows a scale 1 as it may be placed in a laboratory, in a production area, or in a warehouse, for example. The scale 1 has a scale housing 3, in which the weighing cell and the weighing electronics (not shown here) are placed. The weighing pan 2 is connected to the weighing cell. In the example shown in the figure it extends over nearly the entire dimensions of the scale housing 3. The scale 1 stands on three feet or support points 5, respectively, of which only one is visible in the figure. A display and operating unit 6 is connected to the scale 1. It has a display screen 7 and buttons for operating the scale. This display and operating unit 6 can also be placed at a distance from the scale 1. According to the present invention, the display and operating unit 6 is removed from the scale 1 and/or attached to the scale 1 without the use of any tools. Therefore there is a connection element (see FIGS. 2 through 5), which provides a stable coupling of the display and operating unit 6 to the scale housing 3 and, when it is attached to the scale 1, remains in an installed position. If the display and operating unit 6 is to be placed at a distance from the scale 1, the connection element 9 is also be able to be removed, since it is connectable to the scale housing 3 solely by using a catch element, as is described in detail below.

The connection between the scale 1 and the display and operating unit 6 is formed in such a way that both, i.e., the display and operating unit 6 as well as the scale 1, always stand separately from each other on their support base, whereby the scale 1 can be levelled independently from the display and operating unit 6, for example.

Figure 2:
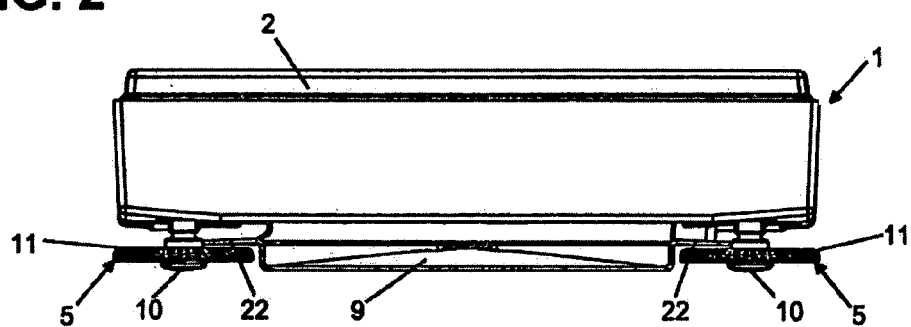
FIG. 2 shows a view from the front side of the scale with a connection element installed.

In FIG. 2, which shows a front view of the scale 1, the display and operating unit 6 has been removed. However, the connection element 9 is still in its installed position, so that it clearly can be seen how it is supported on the two front feet 5. These feet 5 are adjustable in height for levelling. They have a central support bolt 10, which is enclosed by a flat knurled wheel 11. The knurling on the wheel 11 serves for a better handling during adjustment of the feet 5, the support bolt 10 being able to be screwed into and/or out of a thread affixed to the scale housing 3. The flat design of the wheel 11 is particularly advantageous for the support of the connection element 9. In addition, the position of the connection element 9 in relation to the support base is not changed during the levelling procedure.

The scale 1 has a low construction and there is very little space left between its bottom side and the support base, such as a table, on which the scale stands. Therefore, the connection element 9 is designed to be very flat. It is preferably manufactured from an approximately 0.5 to 2 mm thick sheet of aluminium or sheet of steel, other materials, particularly plastic, also being able to be used, of course. The connection element 9 has two approximately horizontally oriented cantilevers 22, which, in the installed state, are offset upwardly in the area of the feet 5, and which are formed in such a way that they can be supported on the surface of the particular wheel 11 of the two feet 5, so that the connection element 9 is guided. The third foot or support point 5' can be seen in FIGS. 3 and 4.

Figure 3:
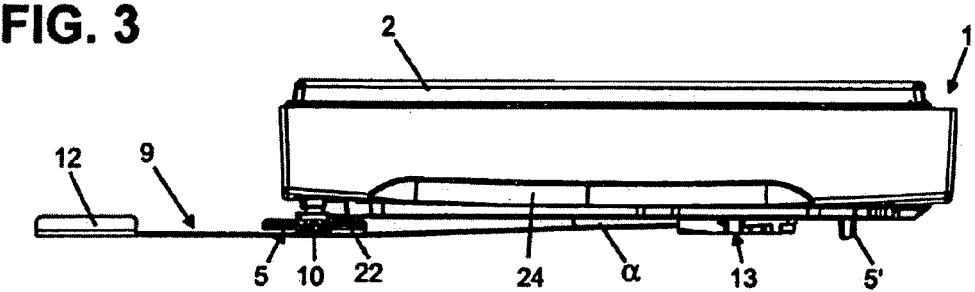
FIG. 3 shows a side view of the scale having an installed connection element, without a display and operating unit.

FIG. 3 shows a side view of the scale 1 with an installed connection element 9. The part of the connection element 9 which carries the display and operating unit 6 has a lateral edge 12, which is designed to engage in a depression on the bottom side of the display and operating unit 6, whereby this unit is guided. The connection element 9 is formed in such a way that in the installed state it runs parallel to the support surface or the support base of the scale 1, respectively, or it possibly rests on the support surface approximately up to the area of the feet 5. In its further course illustrated from left to right in the figure the connection element 9 is bent upwardly by an angle α, so that an engagement in a coupling part 13 is possible. As will be described in more detail below with respect to FIG. 5, this coupling part 13 is designed for self-locating and self-centering insertion of the connection element 9 and allows a catch connection with the connection element 9. The coupling part 13 is positioned close to the third support point 5' of the scale 1 and thus ensures stable positioning, both of the scale 1 and of the display and operating unit 6.

Figure 4:
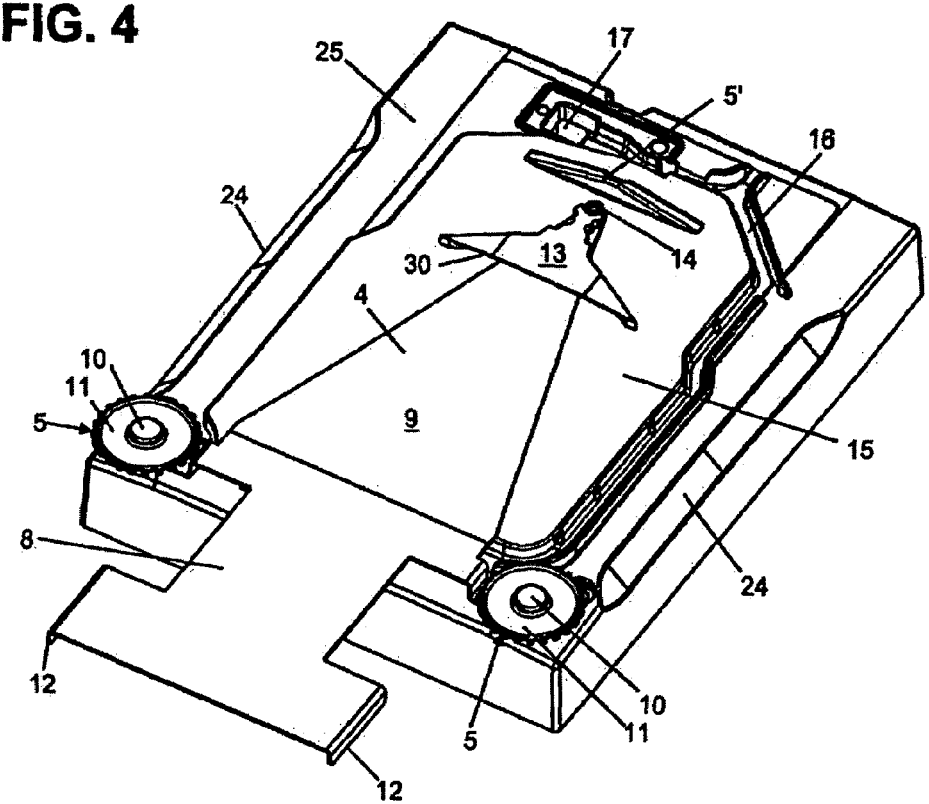
FIG. 4 shows a three-dimensional illustration of the scale from below with a connection element installed.

FIG. 4 shows a inclined perspective view of the scale 1 from below. Here, the connection element 9 is inserted through an opening 30 into the coupling part 13, which is connected solidly to the bottom side of the scale housing 3, for example by a screw 14. A guide groove 16 is also positioned on the bottom side for guiding the unnecessary cable length of a connection cable (not shown here) between the scale 1 and the display and operating unit 6 in case that the display and operating unit 6 is installed directly on the scale 1. The cable has access to the interior of the scale housing 3 via a shaft 17.

The central area 15 of the bottom side of the scale housing 3 is designed to protrude relative to the edge region 25. The scale housing 3 also comprises recessed grips 24 on both sides, so that, when lifting the scale 1 from the support base, easier grasping is made possible.

The third support point or foot 5', respectively, that is attached to the central area 15 of the bottom side of the scale housing 3, has the shape of a rib having a triangular profile, here. Of course, other embodiments for the support point 5' are also conceivable, for example an embodiment as a simple pin.

The connection element 9, which is shown in the figure in its state inserted and engaged in the coupling part 13, has an approximately triangular shape in its area 4 running from the area of its support and guiding on the top side of the particular wheel 11 of the feet 5 to the area inserted into the coupling part 13. In the opposite direction, i.e., up to the area 8, that is designed to engage in the depression provided on the display and operating unit 6 by using the edges 12, the connection element 9 is narrowed somewhat.

Figure 5:
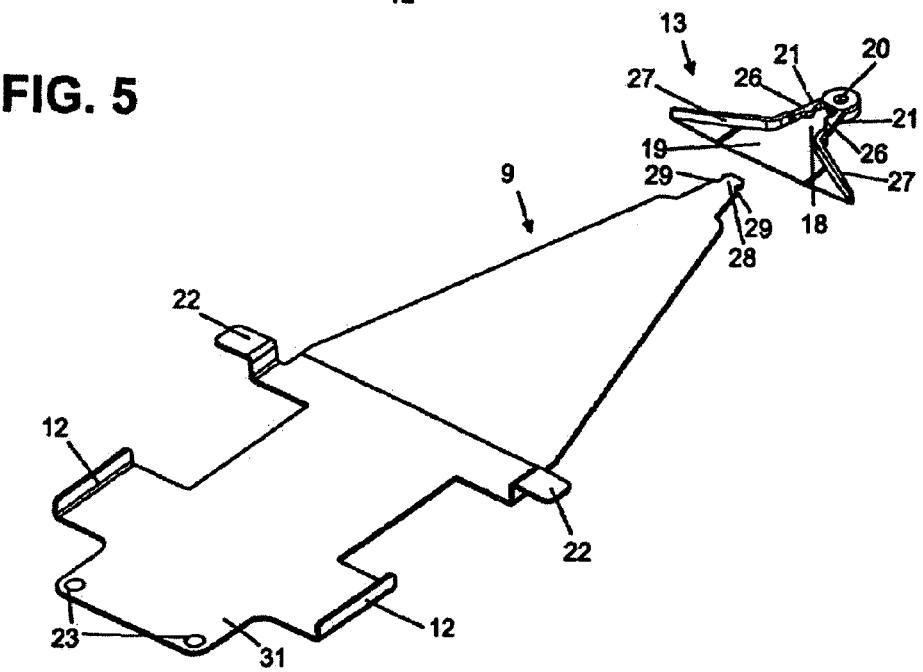
FIG. 5 shows a three-dimensional illustration of the coupling part and the connection element.

The insertion of the connection element 9 into the coupling part 13 is performed in a self-centering way by the special design of these two parts. This may be seen particularly well in FIG. 5, which shows the connection element 9 and the coupling part 13 in a perspective view. FIG. 5 illustrates a view of the areas of the connection element 9 and the coupling part 13 which, when positioned on the scale housing 3 for the intended use, face towards the bottom of the housing.

The area of the coupling part 13 approximately has the shape of two isoceles triangles connected to one another, the triangle 18 facing towards the attachment representing an acute-angled triangle and the triangle 19 facing towards the connection element 9 in the installed state representing an obtuse-angled triangle. The attachment to the scale housing 3 is, for example, performed via a screw connection by using an eye 20. A leg, which is only connected to the coupling part in the area of the eye and can therefore act as a spring 21, is positioned adjoining the eye 20 on each side. Each of these legs 21 has a bulge 26 on its inside to engage the connection element 9. In order to keep the face of the coupling part 13 at a distance from the scale housing 1 in the installed state and to form an opening 30 in the insertion direction of the connection element 9, the coupling part 13 has a border 27 which laterally delimits the obtuse-angled triangle 19. This border 27 also extends into the area tapering towards the acute-angled triangle 18, up to the end of the two legs 21. The border 27, whose height corresponds to that of the two legs 21, is particularly used for guiding an inserting connection part 9, however, and centers it in a position in which it is able to engage. The coupling part 13 is preferably manufactured from a polymer material, but it may also be made of another material having elastic properties, such as metal.

At its tip 28, the connection element 9 is formed in such a way that it comes to rest precisely fitting into the triangle 18 when the connection element 9 is engaged in the coupling part 13. Recesses 29 are provided in which the bulges 26 of the two legs 21 engage.

During the self-centering attachment of the connection element 9 to the scale 1, it is particularly important now that the connection element 9 has an upwardly-directed area 4, by which the connection element 9 is able to slide into the opening 30 of the coupling part 13 in a self-locating way without problems.

On its opposite end, the connection element 9, as is illustrated in FIG. 5, is designed somewhat differently from that of FIG. 4. In this case, the part located below the display and operating unit 6 in the installed state has an extension 31 with protrusions 23, which ensure a more stable contact of the display and operating unit 6 on the connection element 9.

The embodiment described represents a scale whose weighing pan is freely accessible for the placement of the product to be weighed, and whose dimensions extend over the entire area of the scale housing. However, scales which have a draft shield which encloses a weighing chamber, within which a weighing pan having smaller dimensions than that described above is positioned, are also to be considered in the scope of the present invention.

The invention claimed is:

1. A scale having a scale housing serving to house a weighing mechanism and the weighing electronics, the scale housing standing on a support base on at least three support points, the scale comprising:
  a display and operating unit; and
  a connection element for mechanically coupling the scale and the display and operating unit, the connection element being attachable to the bottom of the scale housing, and designed to be supported on a first two of the at least three support points and engagable in a self-locating way in a location on the bottom side of the scale housing.

2. The scale according to claim 1, wherein:
  the connection element is designed for attachment and removal of the display and operating unit to and from the scale housing in a tool-free manner.

3. The scale according to claim 2, further comprising:
  a coupling part, positioned on the bottom side of the scale housing, for the connection element to engage in a self-centering way.

4. The scale according to claim 3, wherein:
  the coupling part is positioned on the scale housing close to the third support point.

5. The scale according to claim 4, wherein:
  the coupling part has the form of two isosceles triangles which are connected to each other, the first triangle representing an acute-angled isosceles triangle and the second triangle, that faces towards the connection element in the installed state, representing an obtuse-angled isosceles triangle.

6. The scale according to claim 5, wherein:
  the coupling part comprises elastic catch elements having bulges, which are formed to engage in recesses of the connection element.

7. The scale according to claim 6, wherein:
  the connection element is designed to be very flat, and is manufactured from one of: an approximately 0.5 to 2 mm thick sheet of aluminium, a sheet of steel, and plastic.

8. The scale according to claim 7, wherein:
  each of the first two support points that support the connection element comprise a wheel for adjusting the level of the scale, the connection element being supported on the top of the wheel.

9. The scale according to claim 8, wherein:
  the connection element is designed to be oriented in the installed state parallel to the support base up to approximately the area of the first two support points and subsequently is bent by an angle α in the direction towards the coupling part in order to provide simple engagement with the coupling part.

10. The scale according to claim 9, wherein: the display and operating unit and the scale stand independently from each other on the support base.

11. The scale according to claim 10, further comprising:
  a guide groove on the bottom side of the scale housing to guide an unneeded length of a connection cable between the scale and the display and operating unit.

12. The scale according to claim 11, further comprising:
  recessed grips on both sides of the scale housing.

13. The scale according to claim 1, further comprising:
  a coupling part, positioned on the bottom side of the scale housing, for the connection element to engage in a self-centering way.

14. The scale according to claim 13, wherein:
  the coupling part is positioned on the scale housing close to the third support point.

15. The scale according to claim 3, wherein:
  the coupling part has the form of two isosceles triangles which are connected to each other, the first triangle representing an acute-angled isosceles triangle and the second triangle, that faces towards the connection element in the installed state, representing an obtuse-angled isosceles triangle.

16. The scale according to claim 3, wherein:
  the coupling part comprises elastic catch elements having bulges, which are formed to engage in recesses of the connection element.

17. The scale according to claim 1, wherein:
  the connection element is designed to be very flat, and is manufactured from one of: an approximately 0.5 to 2 mm thick sheet of aluminium, a sheet of steel, and plastic.

18. The scale according to claim 1, wherein:
  each of the first two support points that support the connection element comprise a wheel for adjusting the level of the scale, the connection element being supported on the top of the wheel.

19. The scale according to claim 1, wherein:

the connection element is designed to be oriented in the installed state parallel to the support base up to approximately the area of the first two support points and subsequently is bent by an angle α in the direction towards the coupling part, in order to provide simple engagement with the coupling part.

20. The scale according to claim 1, wherein:

the display and operating unit and the scale stand independently from each other on the support base.

* * * * *